United States Patent [19]

Walus

[11] 4,273,690
[45] Jun. 16, 1981

[54] COATING COMPOSITIONS OF AN ALKYD-ACRYLIC GRAFT COPOLYMER

[75] Inventor: Aloysius N. Walus, Troy, Mich.

[73] Assignee: E. I. Du Pont de Nemours and Company, Wilmington, Del.

[21] Appl. No.: 82,554

[22] Filed: Oct. 9, 1979

[51] Int. Cl.³ .................... C09D 3/66; C09D 3/68
[52] U.S. Cl. .................... 260/22 CB; 260/22 TN; 260/23 P; 427/407.1; 428/334; 428/335; 428/425.8; 525/38; 525/46
[58] Field of Search .......... 260/22 TN, 22 CB, 23 P; 525/38, 46; 427/407 R; 428/334, 335, 423

[56] References Cited

U.S. PATENT DOCUMENTS

| | | | |
|---|---|---|---|
| 2,718,516 | 9/1955 | Bortnick | 526/312 |
| 2,934,509 | 4/1960 | Crissey et al. | 526/208 |
| 3,716,506 | 2/1973 | Simms et al. | 260/22 CB |
| 3,746,673 | 7/1973 | Simms et al. | 260/22 CB |
| 3,748,293 | 7/1973 | Torelli | 260/21 |
| 3,943,159 | 3/1976 | Quiring et al. | 204/159.24 |
| 4,061,616 | 12/1977 | Murayama et al. | 528/73 |
| 4,082,710 | 4/1978 | Vranchen et al. | 260/22 CB |
| 4,147,679 | 4/1979 | Scriven et al. | 260/22 TN |

*Primary Examiner*—Ronald W. Griffin

[57] ABSTRACT

A coating composition containing as the film forming binder a graft copolymer having an acrylic backbone and alkyd resin chains; wherein the acrylic backbone of the graft copolymer is of polymerized acrylic monomers and contains about 0.1–20% by weight of polymerized isocyanato alkyl acrylates or methacrylates and the alkyd resin side chains are attached to the acrylic backbone by an isocyanato group that reacts with a hydroxyl or carboxyl group of the alkyd resin.

An alkyd resin and plasticizer are usually added to the coating composition. The coating composition can be diluted with water or solvents for application and is particularly useful as a finish for automobiles and trucks and other equipment and can be used to refinish and repair automobile and truck finishes.

28 Claims, No Drawings

COATING COMPOSITIONS OF AN ALKYD-ACRYLIC GRAFT COPOLYMER

BACKGROUND OF THE INVENTION

This invention relates to coating compositions and in particular to an aqueous coating composition of a graft copolymer.

Coating compositions of acrylic polymers are well known as shown by Crissey U.S. Pat. No. 2,934,509, issued Apr. 26, 1960 and provide finishes that have an excellent appearance and that are weatherable and durable but require the finish to be baked. Coating compositions of alkyd resins are also well known and have been used for many years as automotive and truck finishes. These finishes cure at ambient temperatures but do not have the excellent weatherability and durability of the above acrylic finishes. Simple blending of acrylic polymers and alkyd resins does not provide an optimum finish since these acrylic polymers and alkyd resins are not generally compatible. There is a need in the automobile and truck manufacturing industry and in the automobile and truck repair industry for a coating composition that will cure at ambient temperatures which represents significant savings of energy and for a composition that will provide a finish that has a high quality appearance and excellent weatherability and durability.

The novel coating composition of this invention utilizes a graft copolymer of an acrylic polymer and an alkyd resin that provides a finish that cures at ambient temperatures and has an excellent appearance, excellent physical properties and excellent adhesion to all types of coated and uncoated substrates. The composition has an added advantage of being readily formed into a water based composition.

SUMMARY OF THE INVENTION

The coating composition of this invention comprises a liquid diluent and a binder; the binder comprises a graft copolymer having an acrylic backbone and alkyd resin side chains; wherein the backbone of the graft copolymer comprises polymerized ethylencially unsaturated acrylic monomers and from about 0.1-20% by weight, based on the weight of the copolymer, of polymerized isocyanato alkyl acrylates or methacrylates and the alkyd resin side chains are attached to the acrylic backbone by an isocyanato group that has been reacted with a hydroxyl carboxyl group of the alkyd resin.

DETAILED DESCRIPTION OF THE INVENTION

The coating composition contains about 10-70% by weight of a film forming binder and usually about 20-60% by weight of the film forming binder. The remainder of the composition comprises a liquid diluent which can be solvent but preferably is water. If water is the diluent, minor amounts of water dispersible solvents can be added.

The film forming binder of the coating composition comprises a graft copolymer having an acrylic backbone and alkyd resin side chains. Other constituents such as alkyd resins, plasticizers and other polymers that cure at ambient temperatures can be added and are a portion of the film forming binder.

In a process for preparing the graft copolymer, an alkyd resin having hydroxyl groups or carboxyl groups is prepared and reacted with an isocyanato alkyl acrylate or methacrylate. The isocyanate group of the acrylate or methacrylate reacts with the carboxyl or hydroxyl group of the alkyd resin to form a prepolymer having an ethylenically unsaturated group. Ethylenically unsaturated monomers such as alkyl acrylates or methacrylates, including acid monomers such as acrylic or methacrylic acid, are then added and polymerized with the prepolymer to form the graft copolymer.

The alkyd resin used for the graft copolymer is the esterification product of drying oil fatty acids, organic dicarboxylic acids such as aromatic dicarboxylic acids or their anhydrides, and a polyhydric alcohol. Monocarboxylic acids, epoxy resins, monofunctional alcohols and drying oils can be used to prepare the alkyd resin. To prepared the alkyd resin, the above constituents along with an esterification catalyst are charged into a reaction vessel. Either a conventional fusion or solution process using conventional equipment can be used to prepare the alkyd resin. Generally, reaction temperatures of about 150°–250° C. for 1 to 5 hours are used to prepare the resin. The resulting alkyd resin has an acid number of about 1–100 and a number average molecular weight of about 800–4000 determined by gel permeation chromatography.

Typical hydroxyl free solvents that can be used in the solution process for making the alkyd resin are as follows: xylene, toluene and other aromatic solvents, ethers such as dialkyl ether of diethylene glycol, ketones such as methylethyl ketone, saturated aliphatic hydrocarbons, esters such as acetate solvents and the like.

Typical esterification catalysts that are used in the process for preparing alkyd resins are as follows: barium oxide, barium hydroxide, barium naphthenate, calcium oxide, calcium hydroxide, calcium naphthenate, lead oxide, lithium hydroxide, lithium naphthenate, lithium ricinoleate, sodium hydroxide, sodium naphthenate, zinc oxide, lead tallate and dibutyltin oxide which is preferred.

Typical drying oil fatty acids that are used to prepare alkyd resins are as follows: dehydrated castor oil fatty acids, tung oil fatty acids, linseed oil fatty acids, oiticica oil fatty acids, safflower oil fatty acids, soya oil fatty acids, and the like. Dehydrated castor oil fatty acids soya oil fatty acids and tung oil fatty acids are preferred.

Typical aromatic dicarboxylic acids or anhydrides thereof that can be used to preare the alkyd resin are as follows; isophthalic acid, terephthalic acid, phthalic acid and phthalic anhydride.

Typical polyhydric alcohols that can be used to prepare alkyd resins are as follows: ethylene glycol, propylene glycol, 1,3-butylene glycol, pentanediol, neopentyl glycol, hexylene glycol, diethylene glycol, dipropylene glycol, triethylene glycol, glycerol, trimethylolethane, trimethylolpropane, pentaerythritol, methylglucoside, diepentaerythritol, and sorbitol. Pentaerythritol is preferred.

Other monobasic organic acids also can be used to prepare alkyd resins and are as follows: abietic acid, benzoic acid, p-tert-butylbenzoic acid, caproic acid, caprylic acid, crotonic acid, 2-ethyl-hexoic acid, lauric acid, pelargonic acid, rosin acids, and the like.

Monofunctional alcohols also can be used to prepare alkyd resins and are as follows: butanol, pentanol, hexanol, isooctanol, ethoxyethanol, and butyl carbitol.

Drying oils also can be used to prepare the alkyd resin such as castor oil, heat bodied soya oil, soya oil, corn oil, dehydrated castor oil, linseed oil, oiticica oil, safflower oil and tung oil.

Epoxy resins such as epoxy resins of bisphenol A and epichlorohydrin, hydrogenated bisphenol A and epicholorhydrin, novolac epoxy resins and the like can also be used to prepare the alkyd resin.

The following are preferred alkyd resins that form high quality compositions: dehydrated castor oil fatty acids/benzoic acid/pentaerythritol/phthalic anhydride/epoxy resin of hydrogenated bisphenol A and epichlorohydrin; dehydrated castor oil fatty acids/soya bean oil fatty acids/benzoic acid/pentaerythritol/phthalic anhydride/isophthalic acid; dehydrated castor oil fatty acids/benzoic acid/pentaerythritol/phthalic anhydride/isophthalic acid and tung oil fatty acids/dehydrated castor oil fatty acids/benzoic acid/phthalic acid/isophthalic acid/pentaerythritol.

Isocyanato alkyl acrylates or isocyanato alkyl methacrylate monomers are then added to the alkyd resin. A molar ratio of the isocyanato monomers to alkyd resin polymer chains is used such that on an average one isocyanato monomer reacts with a carboxyl or hydroxyl group of an alkyd resin chain to form a chain having a single ethylenically unsaturated group on each resin chain. To react the isocyanato monomer with the alkyd resin, a catalyst is added such as dibutyl tin dilaurate and additional solvent and reaction temperatures of about 50°–120° C. for about 0.25–1.0 hour are used.

Other catalyst that can be used are tertiary amines and polyamines well known in the art.

Typical isocyanato monomers that can be used are as follows: isocyanatoethyl acrylate, isocyanatoethyl methacrylate (ICEMA), isocyanatobutyl acrylate, isocyanatobutyl methacrylate, isocyanatohexyl acrylate and isocyanatohexyl methacrylate. ICEMA is a preferred monomer because of its availability and ease of copolymerization with other monomers.

To prepare the graft copolymer ethylenically unsaturated monomers of the backbone are added to the alkyd resin that has been reacted with an isocyanato alkyl acrylate or methacrylate along with a conventional polymerization catalyst and optionally solvents. Any of the aforementioned solvents can be used. The above constituents are reacted at about 50°–170° C. for about 1–6 hours to form the graft copolymer.

The resulting graft copolymer comprises about 25–90% by weight of acrylic backbone and about 10–75% by weight of alkyd resin side chains and contains about 0.1–20% by weight of reacted and polymerized isocyanato alkyl acrylate or methacrylate. The graft copolymer has a number average molecular weitht (Mn) of about 3,000 to 10,000 measured by gel permeation chromatography using polystyrene as a standard.

Typical ethylenically unsaturated acrylic monomers used to prepare the graft copolymer are as follows: alkyl methacrylates having 1–12 carbon atoms in the alkyl groups such as methyl methacrylate, ethyl methacrylate, propyl methacrylate, butyl methacrylate, hexyl methacrylate, octyl methacrylate, nonyl methacrylate, lauryl methacrylate; alkyl acrylates having 1–12 carbon atoms in the alkyl group such as methyl acrylate, ethyl acrylate, propyl acrylate, butyl acrylate, hexyl acrylate, octyl acrylate, lauryl acrylate; acrylonitrile, methacrylonitrile, styrene, hydroxyalkyl acrylates and methacrylates such as hydroxyethyl acrylate, hydroxypropyl acrylate, hydroxybutyl acrylate, hydroxyethyl methacrylate, hydroxypropyl methacrylate, hydroxybutyl methacrylate and the like. To provide a graft copolymer that is water dispersible about 2–10% by weight, based on the weight of the graft copolymer of ethylenically unsaturated carboxylic acid monomers are used such as acrylic acid, methacrylic acid, maleic acid, itaconic acid, maleic anhydride, fumaric acid and the like.

To provide compatibility with plasticizers and alkyd resin used in coating compositions prepared with the graft copolymer, monomers that provide compatibility with these plasticizers and alkyd resins can be included in the backbone in amounts of about 1–10% by weight of the graft copolymer. Typical monomers of this type are diethyl aminoethyl methacrylate and tertiarty butyl aminoethyl methacrylate. However, these monomers tend to react with the acid in the polymer such as methacrylic acid. To prevent this from occurring after the graft copolymer is formed with these monomers, additional isocyanato alkyl acrylate or methacrylate can be added. The isocyanato group will react with these monomers and provide extra ethylenically unsaturated groups on the polymer which readily cure after application of a coating composition as the composition is dried.

Typical polymerization catalysts that can be used to form the graft copolymer are as follows: azobisisobutyronitrile, 2,2-azobis(2,4-dimethylvaleronitrile), benzoyl peroxide, ditertiary butyl peroxide, tertiary butyl hydroperoxide, t-butyl peroxy pivalate and the like.

After the graft copolymer is prepared and an aqueous coating composition is desired, a base such as ammonia or amine or a combination thereof is added. The base reacts with free carboxyl groups of the graft copolymer to form salt groups which allow the graft copolymer to be dispersed in an aqueous medium. Water is then added to form a coating composition. The pH of the resulting composition can be adjusted to about 6.5–9. A pH of about 7–8 is usually used.

Typical amines that can be used are triethylamine, trimethylamine, ethanolamine, N,N-diethylethanolamine, N,N-dimethylethanolamine, N-methylethanolamine, N-methylethanolamine, monoisopropanolamine, butanolamine, ethylenediamine, diethylamine and the like.

To formulate a coating composition, the polymer after preparation which is in solution is blended with an alkyd resin, conventional driers, pigments, and plasticizers. Pigments can be omitted and the composition can be used as a clear coating composition.

About 1–20% by weight, based on the weight of the binder, of any of the aforementioned alkyd resins used to prepare the graft copolymer can be used. The preferred alkyd resins are those that are preferred for the graft copolymer as mentioned above.

Conventional plasticizers can be used in the coating composition in amounts about 1–20% by weight, based on the weight of the binder; usually, about 5–15% by weight of plasticizer is used. Generally, the amount of alkyd resin and plasticizer should not exceed 35% by weight of the binder. Typically useful plasticizers are butyl benzylphthalate and trimethylol propane trimethacrylate. Certain formulations of the graft copolymer can also be used as a plasticizer. One typical graft copolymer comprises a backbone of polymerized monomers of methylmethacrylate, butylacrylate, isocyanato ethyl methacrylate and side chains of an alkyd resin of pelargonic acid, benzoic acid, pentaerythritol and adipic acid.

Typical pigments that are used in the coating composition are metallic oxides such as titanium dioxide, iron oxide, zinc oxide, and the like, metallic flakes such as aluminum flake, bronze flake, nickel flake, metallic powders, metallic hydroxides, phthalocyanine pigments, "Monastral" pigments, molybdate pigments such as molybdate orange pigment, quinacridone pigments, sulfate pigments, carbonate pigments, carbon black pigments, silica pigments and other organic and inorganic pigments commonly used in coatings. Pigments are added in a pigment to binder weight ratio of about 0.5/100 to 200/100 where the binder is the film forming constituent of the coating composition. The pigments are usually dispersed with a graft copolymer or another resin to form a pigment dispersion by conventional techniques such as sand grinding, ball milling, attritor grinding and the like. The pigment dispersion is then added to the coating composition.

Typically useful pigment dispersing resins are disclosed in Jakubauskas U.S. Pat. No. 3,980,602 issued Sept. 14, 1976. One preferred resin that forms a high quality product is a polymer of methyl methacrylate/styrene/butyl acrylate/acrylic acid. The following ratio of constituents is particularly preferred 25/30/35/10.

Organo metallic driers can be added to the coating composition in amounts of about 0.01-5% by weight, based on the weight of the coating composition. Typical metallic driers are based on cobalt, copper, lead, zirconium, calcium, iron, nickel, tin, zinc, lithium and the like and are cobalt naphthenate, copper naphthenate, lead tallate, calcium naphthenate, iron naphthenate, lithium naphthenate, lead naphthenate, nickel octoate, zirconium octoate, cobalt octoate, iron octoate, zinc octoate, alkyl tin dilaurates such as dibutyl tin dilaurate and the like.

The coating composition can be sold as a solvent based composition and then reduced to an application viscosity with an aqueous solution containing an amine or ammonia or the composition can be sold in an aqueous medium and also reduced to an application viscosity with the above aqueous solution. The composition can be applied to a variety of substrates by any of the conventional application methods such as spraying, electrostatic spraying, dipping, brushing, flow coating, roller coating and the like. The resulting coatings can be dried at ambient temperatures or baked at relatively low temperatures up to about 140° C. for about 5 minutes to 2 hours. The resulting coating is about 0.1-5 mils thick and is glossy, durable, weatherable, and has an excellent appearance.

The composition has excellent adhesion to all types of substrates such as wood, glass, bare metal, primed metal, phosphatized metal, metal painted with the following: acrylic enamel, acrylic lacquer, acrylic dispersion enamel, acrylic dispersion lacquer, alkyd enamel, conventional alkyd or epoxy primers; fiberglass reinforced with polyester painted as above; acrylonitrile/butadiene/styrene plastics or other plastics painted as above. The aforementioned characteristics make the composition particularly useful as a finish or a refinish used for automobiles and truck bodies.

Another aspect of this invention is to utilize the composition as a clear coat/color coat finish for substrates. In this finish, a clear coat top layer is in firm adherence to a color coat layer that is in adherence with a substrate. The clear coat is a transparent film of the coating composition of this invention and the color coat is the coating composition of this invention containing pigments in a pigment to binder ratio of about 1/100 to 150/100 and other additives.

Optionally, the color coat can contain about 0.1-20% by weight, based on the weight of the binder of the color coat, of an ultraviolet light stabilizer. Another option is that the color coat and the clear coat each can contain about 1-20% by weight, based on the weight of the binder of the coat, of an ultraviolet light stabilizer and about 0.1-5% by weight, based on the weight of the binder of the coat, of an antioxidant; wherein the weight ratio of ultraviolet light stabilizer to antioxidant is about 1:1 to about 50:1.

Preferred, to form a durable finish, both the clear coat and the color coat contain about 5-8% by weight of an ultraviolet light stabilizer along with about 0.1-1% by weight of the antioxidant and the ratio of ultraviolet light stabilizer to antioxidant is about 10:1.

The thickness of the fully cured color coat and clear coat can vary. Generally, the color coat is about 0.4-1.5 mils thick and preferably 0.6-1.0 mils thick and the clear coat is about 0.5-6.0 mils thick and preferably 0.8-1.5 mils thick. Any of the aforementioned conventional pigments can be used in the color coat including metallic flake pigments can be used. The clear coat can also contain transparent pigments, i.e., pigments having the same or similar refractive index as the binder of the clear coat and are of a small particle size of about 0.015-50 microns. Typical pigments that can be used in a pigment to binder weight ratio of about 1/100 to 10/100 are inorganic siliceous pigments, such as silica pigments. These pigments have a refractive index of about 1.4-1.6.

Typical ultraviolet light stabilizers that are useful are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',4'-dihydroxybenxoyl)-triazoles, substituted benzotriazoles such as hydroxy-phenyltriazoles and the like.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis-(2'-hydroxybenzoyl)benzene, metal derivatives of 3,5-di-t-butyl-4-hydroxy phenyl proprionic acid, asymmetrical oxalic acid diarylamides, alkylhydroxyphenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

Typical antioxidants that are useful are as follows: tetrakis alkylene(di-alkyl hydroxy aryl)alkyl ester alkanes such as tetrakis methylene 3(3',5'-dibutyl-4'hydroxyphenyl)proprionate methane, reaction product of p-amino diphenylamine and glycidyl methacrylate, reaction product of n-hexyl-N'-phenyl-p-phenylene diamine and glycidyl methacrylate, pentaerythritol tetrakis(thioglycolate), trimethylol propane tris(thioglycolate), trimethylol ethane tris(thioglycoate), N-(4-anilino phenyl)acrylamide and the like.

One preferred combination of ultraviolet light stabilizer and antioxidant is 2-hydroxy-4-dodecyloxy benzophenone or a substituted 2(2-hydroxyphenyl)benzotriazole and tetrakis methylene 3(3',5'-dibutyl-4'hydroxyphenyl)proprionate methane.

The clear coat/color coat finish is applied by conventional spraying techniques and preferably the clear coat is applied to the color coat while the color coat is still wet. Other conventional application techniques can be used such as brushing, roller coating, electrostatic spraying and the like. The finish is then dried at ambient temperatures or can be used as indicated above.

The following examples illustrate the invention. All parts and percentages unless otherwise indicated are on a weight basis. The number average molecular weight (Mn) is determined by gel permeation chromatography using polystyrene as a standard.

EXAMPLE 1

Alkyd Resin

An alkyd resin solution is prepared as follows:

|  | Parts by Weight |
|---|---|
| Portion 1 | |
| Dehydrated castor oil fatty acids | 743.4 |
| Benzoic acid | 121.5 |
| Pentaerythritol | 192.5 |
| Dibutyl tin oxide | 0.7 |
| Xylene | 52.0 |
| Portion 2 | |
| Phthalic anhydride | 196.5 |
| Portion 3 | |
| Epoxy Resin - (Epoxy resin of hydrogenated bisphenol A and epichlorohydrin having an epoxide equivalent weight of 232-238 and a viscosity measured at 25° C. of 20-25 poise) | 311.8 |
| Portion 4 | |
| Dimethyl benzyl amine | 0.5 |
| Portion 5 | |
| Toluene | 212.0 |
| Total | 1830.9 |

Portion 1 is charged into a conventional polymerization vessel equipped with a stirrer, reflux condenser, thermometer, a heating mantle and a nitrogen inlet. During the following reaction, the reaction mixture is blanketed with nitrogen and is under constant agitation. Portion 1 is heated to its reflux temperature and held at its reflux temperature and reacted for about 2½-3 hours until the resulting reaction mixture reaches an acid number of less than 3. Water resulting from the reaction is removed as it is formed. Portion 2 is added and when melted, Portion 3 is added. Portion 4 is added and the reaction mixture is held at its reflux temperature for about 30 minutes until an acid number of less than 10 is reached. Portion 5 is added and the resulting alkyd resin solution is cooled to room temperature.

The alkyd resin solution has a solids content of about 85% and a Gardner Holdt viscosity measured at 25° C. and at the above solids content of about Z-4. The alkyd resin has an acid number of about 8 and a weight average molecular weight of about 2000.

Acrylic Alkyd Resin Graft Copolymer

An acrylic alkyd resin graft copolymer solution is prepared as follows:

|  | Parts by Weight |
|---|---|
| Portion 1 | |
| Alkyd Resin Solution (prepared above) | 647.0 |
| Portion 2 | |
| 2-Isocyanato ethyl methacrylate monomer | 10.0 |
| Diethylene glycol dimethyl ether | 150.0 |
| Dibutyl tin dilaurate | 0.3 |
| Portion 3 | |
| Acetone | 100.0 |
| Portion 4 | |
| Methyl methacrylate monomer | 100.0 |
| Butyl methacrylate monomer | 100.0 |
| Methacrylic acid monomer | 20.0 |
| Dodecyl mercaptan | 5.0 |
| Portion 5 | |
| Azobisisobutyronitrile | 12.0 |
| Methyl ethyl ketone | 50.0 |
| Ethylene glycol monoethylether | 50.0 |
| Portion 6 | |
| Methyl methacrylate monomer | 80.0 |
| Butyl methacrylate monomer | 90.0 |
| Methacrylic acid monomer | 50.0 |
| 2-Mercaptoethanol | 5.0 |
| Ethylene glycol monobutyl ether | 91.0 |
| Portion 7 | |
| Azobisisobutyronitrile | 2.0 |
| Portion 8 | |
| Azobisisobutyronitrile | 2.0 |
| Total | 1562.3 |

Portion 1 is charged into a conventional polymerization vessel equipped as above, blanketed with nitrogen and heated to its reflux temperature to remove any moisture and about 10 parts by weight of solvents. The monomer of portion 2 is premixed with the diethylene glycol ether and slowly added while the dibutyl tin dilaurate is added separately in drops. The resulting reaction mixture is held at about 140° C. for about 60 minutes. Portion 3 is then slowly added. Portion 4 is premixed and added to the reaction mixture which is heated to its reflux temperature of about 90° C. Portions 5 and 6 are each premixed and are added simultaneously to the reaction mixture over about a 60 minute period while maintaining the reaction mixture at about 90°-95° C. After the addition of portions 5 and 6, the reaction mixture is held at the above temperature for about 30 minutes. Portion 7 is then added and the reaction mixture is held at the above temperature for an additional 50 minutes and then Portion 8 is added and the reaction mixture is held at the above temperature for an additional 60 minutes.

The resulting graft copolymer resin solution has a solids content of 63%, a Gardner Holdt viscosity measured at 25° C. of Z, and the resin has an acid number of about 48.5. The graft copolymer resin comprises 55% alkyd resin, 1% isocyanatoethyl methacrylate, 19% butyl methacrylate, 18% methyl methacrylate and 7% methacrylic acid. The alkyd resin is grafted to the backbone of butyl methacrylate, methyl methacrylate, methacrylic acid by isocyanato ethyl methacrylate.

The graft copolymer has a Mn in the range of about 3,000-10,000.

A drier solution is prepared by blending together the following constituents:

| | Parts by Weight |
|---|---|
| Zirconium Octoate Solution (6% by weight Zirconium in mineral spirits) | 37.79 |
| Cobalt Naphthenate Solution (55% solids cobalt naphthenate in mineral spirits) | 56.60 |
| 1, 10 phenanthroline | 5.61 |
| Total | 100.00 |

A clear coating composition is prepared by blending the following constituents:

| | Parts by Weight |
|---|---|
| Graft copolymer resin solution (prepared above) | 100.0 |
| Drier solution (prepared above) | 3.6 |
| 5% Aqueous ammonium hydroxide solution | 23.4 |
| Water | 130.0 |
| Total | 257.0 |

The above coating composition is sprayed onto a phosphatized steel substrate and dried at an ambient temperature. The resulting film is tack free after two hours and is glossy and clear. The film after 3 days is resistant to a 50/50 aliphatic/aromatic solvent mixture.

A white coating composition is prepared by first forming a white mill base and then preparing the coating composition with this mill base.

| White Mill Base | Parts by Weight |
|---|---|
| Graft copolymer resin solution (prepared above) | 134 |
| Ethylene glycol monoethylether | 91 |
| Titanium dioxide pigment | 433 |
| Total | 658 |

The above constituents are mixed together and then charged into a conventional sand mill and ground for two passes.

| White coating Composition | Parts by Weight |
|---|---|
| White Mill Base (prepared above) | 125 |
| Graft copolymer resin solution (prepared above) | 261 |
| Drier solution (prepared above) | 10 |
| 5% Aqueous ammonium hydroxide solution | 66 |
| Water | 400 |
| Total | 862 |

The above coating composition is sprayed onto a phosphatized steel substrate and dried at an ambient temperature. The resulting film is dried to a tack free condition in two hours and provides a smooth, glossy, weatherable film about 2–3 mils thick that is resistant to solvents after 3 days.

An aluminum paint is prepared by blending the following constituents together:

| | Parts By Weight |
|---|---|
| Aluminum Paste (66% Aluminum Flake in mineral spirits) | 12 |
| Graft copolymer solution (prepared above) | 308 |
| Drier solution (prepared above) | 11 |
| 5% Aqueous ammonium hydroxide Solution | 70 |
| Water | 455 |
| Total | 856 |

The above coating composition is sprayed onto a phosphatized steel substrate and dried at an ambient temperature. The resulting film dried to a tack free condition in about two hours and provides a smooth, glossy, weatherable film about 2–3 mils thick that has an excellent metallic appearance and is resistant to solvents in about 3 days.

EXAMPLE 2

An alkyd resin solution is prepared as follows:

| | Parts by Weight |
|---|---|
| Portion 1 | |
| Dehydrated castor oil fatty Acids | 778.0 |
| Soyabean oil fatty acids | 1182.0 |
| Benzoic acid | 343.0 |
| Pentaerythritol | 816.0 |
| Phthalic anhydride | 417.0 |
| Isophthalic acid | 233.0 |
| Dibutyl tin oxide | 2.8 |
| Xylene | 146.0 |
| Portion 2 | |
| Toluene | 243.0 |
| Diethylene glycol dimethyl ether | 228.0 |
| Total | 4388.8 |

Portion 1 is charged into a polymerization vessel equipped as in Example 1 and blanketed with nitrogen. During the following reaction the constituents in the vessel are under constant agitation. Portion 1 is heated to its reflux temperature and held at this temperature until the resulting reaction mixture reaches an acid number below 5 which requires about 6 hours. Water is removed from the reaction mixture as water is formed. Portion 2 is then added and the resulting alkyd resin solution is cooled to room temperatures.

The alkyd resin solution has a solids content of about 85% and has a Gardner Holdt viscosity measured at 25° C. of about Y. The alkyd resin has an acid number of about 3.3 and a Mn of about 2200.

Acrylic Alkyd Resin Graft Copolymer

An acrylic resin graft copolymer solution is prepared as follows:

| | Parts by Weight |
|---|---|
| Portion 1 | |
| Alkyd resin solution (prepared above) | 440.0 |
| Portion 2 | |
| 2-Isocyanato ethyl methacrylate monomer | 8.0 |
| Diethylene glycol dimethyl ether | 80.0 |
| Portion 3 | |

-continued

|  | Parts by Weight |
|---|---|
| Dibutyl tin dilaurate | 0.2 |
| Portion 4 | |
| Acetone | 110.0 |
| Portion 5 | |
| Methyl methacrylate monomer | 340.0 |
| Butyl methacrylate monomer | 80.0 |
| Methacrylic acid monomer | 17.0 |
| Dodecyl mercaptan | 18.0 |
| Portion 6 | |
| Methyl methacrylate monomer | 120.0 |
| Butyl methacrylate monomer | 40.0 |
| Methacrylic acid monomer | 25.0 |
| Ethylene glycol monobutyl ether | 200.0 |
| Portion 7 | |
| Azobisisobutyronitrile | 16.0 |
| Acetone | 30.0 |
| Methyl ethyl ketone | 50.0 |
| Ethylene glycol monobutyl ether | 100.0 |
| Ethylene glycol monobutyl ether acetate | 37.0 |
| Total | 1711.2 |

Portion 1 is charged into a conventional polymerization vessel equipped as in Example 1 blanketed with nitrogen and heated to its reflux temperature to remove any moisture and about 10 parts of solvents. Portion 2 is premixed and added slowly to the polymerization vessel over a 15 minute period. Portion 3 is added and the resulting reaction mixture is held at about 130° C. for about 30 minutes. Portion 4 is then slowly added while the reaction mixture is at its reflux temperature. Portion 5 is premixed and added and the reaction mixture is held at its reflux temperature of about 88° C. Portions 6 and 7 are premixed and added simultaneously after portion 5 is added. Portion 6 is added over a 60 minute period and Portion 7 is added over a 90 minute period while maintaining the reaction mixture at its reflux temperature. The reaction mixture is cooled to room temperature.

The resulting graft copolymer solution has a solids content of about 60% and a Gardner Holdt viscosity measured at 25° C. of about Z. The graft copolymer has an acid number of about 27 and comprises about 37% alkyd resin side chain and a backbone of about 0.8% of 2-isocyanatoethyl methacrylates, 46% methyl methacrylate, 12% butyl methacrylate and 4.2% methacrylic acid. The graft copolymer has an Mn in the range of about 3,000-10,000.

A clear coating composition is prepared by blending the following constituents:

|  | Parts by Weight |
|---|---|
| Portion 1 | |
| Graft copolymer solution (prepared above) | 169.0 |
| Cobalt naphthenate drier solution (55% solids cobalt naphthenate in mineral spirits) | 2.0 |
| Portion 2 | |
| Triethylamine | 4.9 |
| Water | 190.0 |
| Total | 365.9 |

Portion 1 is charged into a mixing vessel and thoroughly mixed and then portion 2 is added and mixed to form a coating composition. The resulting coating composition is a fine dispersion that has excellent sprayability. When sprayed onto a phosphatized steel substrate, a tack free film is formed in about 4 hours that is resistant to tape printing and water spotting in 24 hours.

EXAMPLE 3

An acrylic alkyd resin graft copolymer solution is prepared as follows:

|  | Parts by Weight |
|---|---|
| Portion 1 | |
| Alkyd resin solution (prepared in Example 2) | 471.0 |
| Portion 2 | |
| 2-Isocyanato ethyl methacrylate | 10.0 |
| Diethylene glycol dimethylether | 60.0 |
| Portion 3 | |
| Dibutyl tin dilaurate | 0.2 |
| Portion 4 | |
| Acetone | 100.0 |
| Portion 5 | |
| Methyl methacrylate monomer | 290.0 |
| Butyl methacrylate monomer | 70.0 |
| t-Butyl aminoethyl methacrylate monomer | 25.0 |
| Methacrylic acid monomer | 15.0 |
| Dodecyl mercaptan | 18.0 |
| Portion 6 | |
| Methyl methacrylate monomer | 100.0 |
| Butyl methacrylate monomer | 30.0 |
| t-Butyl aminoethyl methacrylate monomer | 5.0 |
| Methacrylic acid monomer | 25.0 |
| Portion 7 | |
| Azobisisobutyronitrile | 16.0 |
| Acetone | 30.0 |
| Methyl ethyl ketone | 50.0 |
| Diethylene glycol dimethyl ether | 100.0 |
| Portion 8 | |
| Ethylene glycol monobutyl ether | 150.0 |
| Portion 9 | |
| 2-Isocyanato ethyl methacrylate | 30.0 |
| Diethylene glycol diethyl ether | 50.0 |
| Ethylene glycol monobutyl ether acetate | 67.0 |
| Total | 1712.2 |

Portion 1 is charged into a conventional polymerization vessel equipped as in Example 1 blanketed with nitrogen and heated to its reflux temperature to remove any moisture and about 11 parts by weight of solvents. Portion 2 is premixed and added slowly over a 15 minute period and then Portion 3 is added and the resulting reaction mixture is held at about 130° C. for about 30 minutes. Portion 4 is slowly added while the reaction mixture is held at its reflux temperature. Portion 5 is premixed and added to the reaction mixture after heating the reaction mixture to its reflux temperature. Portions 6 and 7 are premixed and added simultaneously to the reaction mixture. Portion 6 is added over a 60 minute period and portion 7 is added over a 90 minute period while the reaction mixture is held at its reflux temperature. About one third of portion 8 is added and the reaction mixture is held at about 90° C. for about 2 hours and then the remainder of portion 8 is added. Portion 9 is premixed and added without further heating the reaction mixture and then the reaction mixture is held for about 30 minutes and then cooled to an ambient temperature.

The resulting graft copolymer solution has a solids content of about 60% and a Gardner Holdt viscosity measured at 25° C. of about Z-3. The copolymer has an acid number of about 26.2 and comprises a side chain of about 40% alkyd resin and a backbone of about 4% isocyanato ethyl methacrylate, 39% methyl methacrylate, 10% butyl methacrylate, 3% t-butyl aminoethyl methacrylate and 4% methacrylic acid. The graft copolymer has a Mn in the range of about 3,000-10,000.

A clear coating composition is prepared by blending the following constituents:

|  | Parts by Weight |
|---|---|
| Graft copolymer solution (prepared above) | 167.0 |
| Cobalt naphthenate drier solution (described in Example 2) | 2.0 |
| Triethylamine | 4.7 |
| Water | 128.0 |
| Total | 301.7 |

The above constituents are blended together to form a coating composition of a very fine transparent dispersion that has excellent spray characteristics. The coating composition is sprayed onto a phosphatized steel panel and dried at an ambient temperature. The resulting film dries to a tack free state in about 4 hours and is resistant to water spotting and tape printing in 24 hours.

Another clear coating composition is prepared by blending together the following constituents:

|  | Parts by Weight |
|---|---|
| Graft copolymer solution (prepared above) | 142.0 |
| Alkyd resin solution (prepared in Example 2) | 18.0 |
| Cobalt naphthenate drier solution (described in Example 2) | 2.0 |
| Triethylamine | 4.1 |
| Water | 150.0 |
| Total | 316.1 |

The above constituents are blended together to form a coating composition of a very fine milky dispersion that has excellent spray characteristics. The coating composition is sprayed onto a phosphatized steel panel and dried at an ambient temperature.

The resulting film dries to a tack free state in about four hours and after 24 hours has good tape print, water spot and gasoline resistance.

EXAMPLE 4

An alkyd resin solution is prepared as follows:

|  | Parts by Weight |
|---|---|
| Portion 1 | |
| Dehydrated castor oil fatty acids | 1970.0 |
| Benzoic Acid | 343.0 |
| Pentaerythritol | 816.0 |
| Phthalic anhydride | 417.0 |
| Isophthalic acid | 233.0 |
| Dibutyl tin oxide | 2.8 |
| Xylene | 146.0 |
| Portion 2 | |
| Toluene | 243.0 |
| Portion 3 | |
| Diethylene glycol dimethyl ether | 288.0 |
| Total | 4458.8 |

Portion 1 is charged into a polymerization vessel equipped as in Example 1 and blanketed with nitrogen. During the following reaction the constituents in the vessel are under constent agitation. Portion 1 is heated to its reflux temperature and held at this temperature until the resulting reaction mixture reaches an acid number of about 6 which requires about 6 hours. Water is removed from the reaction mixture as it is formed. Portion 2 is then added and then Portion 3 is added and the reaction mixture is cooled to room temperature. The resulting alkyd resin solution has a solids content of about 85% and has a Gardner Holdt viscosity of about Z2. The alkyd resin has an acid number of about 4 and a number average molecular weight of about 2200.

Acrylic Alkyd Resin Graft Copolymer

An acrylic alkyd resin graft copolymer solution is prepared as follows:

|  | Parts by Weight |
|---|---|
| Portion 1 | |
| Alkyd resin solution (prepared above) | 1130.0 |
| Portion 2 | |
| 2-Isocyanato ethyl methacrylate monomer | 16.8 |
| Diethylene glycol dimethyl ether | 144.0 |
| Portion 3 | |
| Dibutyl tin dilaurate | 0.5 |
| Portion 4 | |
| Acetone | 192.0 |
| Portion 5 | |
| Methyl methacrylate monomer | 720.0 |
| Lauryl methacrylate monomer | 118.4 |
| t-Butyl aminoethyl methacrylate monomer | 36.0 |
| Methacrylic acid | 36.0 |
| Dodecyl mercaptan | 48.0 |
| Portion 6 | |
| Methyl methacrylate monomer | 312.0 |
| Lauryl methacrylate monomer | 40.0 |
| t-Butyl aminoethyl methacrylate monomer | 36.0 |
| Methacrylic acid monomer | 60.0 |
| Dodecyl mercaptan | 12.0 |
| Ethylene glycol monobutyl ether | 240.0 |
| Portion 7 | |
| Azobisisobutyronitrile | 43.0 |
| Acetone | 70.0 |
| Methyl ethyl ketone | 120.0 |
| Ethylene glycol monobutyl ether | 240.0 |
| Portion 8 | |
| Ethylene glycol monobutyl ether ether acetate | 150.0 |
| Ethylene glycol monobutyl ether | 134.0 |
| Portion 9 | |
| 2-Isocyanato ethyl methacrylate monomer | 64.8 |
| Diethylene glycol dimethyl ether | 160.0 |
| Total | 4123.5 |

Portion 1 is changed into a conventional polymerization vessel equipped as in Example 1 and placed under a blanket of nitrogen and is heated to its reflux temperature to remove any moisture and about 20 parts by weight of solvent. Portion 2 is premixed and slowly added to the vessel over a 15 minute period. Portion 3 is then added and held at 135° C. for 30 minutes. Portion 4 is then added over a 15 minute period and then portion 5 is added and the resulting reaction mixture is heated to its reflux temperature. About one fifth of portion 7 is then added while the reaction mixture is at its reflux temperature and held at its reflux temperature for 20 minutes. About one third of portion 6 is added with about one fifth of portion 7 and the reaction mixture is held at its reflux temperature for about 20 minutes. About one third of portion 6 and one fifth of portion 7 are added and the reaction mixture is held at its reflux temperature for 20 minutes. Then the remaining one third of portion 6 with one fifth of portion 7 are added and all of portion 8 is slowly added over a 20 minute period while the reaction mixture is held at its reflux temperature. The remainder of portion 7 is added and the reaction mixture is brought to its reflux temperature and held at its reflux temperature over the next two hours. The reaction mixture is not heated further and portion 9 is added and the reaction mixture is slowly cooled to room temperature.

The resulting graft copolymer solution has a solids content of about 60% and a Gardner Holdt viscosity measured at 25° C. of about Z4-Z5. The graft copolymer has an acid number of about 23.3 and comprises about 40% alkyd resin side chains and a backbone of about 0.7% by weight of isocyanato ethyl methacrylate, 43% methyl methacrylate, 6.6% lauryl methacrylate, 3.0% tertiary butyl aminoethyl methacrylate, 4.0% methacrylic acid and 2.7% of isocyanato ethyl methacrylate that has been reacted with the t-butyl amino ethyl methacrylate monomer. The graft copolymer has a Mn of about 3,000-10,000.

Acrylic Polymer/Alkyd Resin Blend

An acrylic alkyd resin blend is prepared by using the above constituents and polymerication procedure as used in making the acrylic alkyd resin graft copolymer except portions 2 and 3 are omitted. A graft copolymer is not formed since the isocyanato ethy methacrylate of portion 2 which is the grafting site monomer is omitted.

Plasticizer Resin

A plasticizer resin solution is prepared as follows:

|  | Parts by Weight |
|---|---|
| Portion 1 |  |
| Pelargonic acid | 309.5 |
| Benzoic acid | 95.6 |
| Pentaerythritol | 189.3 |
| Adipic acid | 152.5 |
| Dibutyl tin oxide | 1.0 |
| Toluene | 20.0 |
| Portion 2 |  |
| Toluene | 60.0 |
| Portion 3 |  |
| 2-Isocyanato ethyl methacrylate monomer | 10.2 |
| Diethylene glycol dimethyl ether | 130.0 |
| Portion 4 |  |
| Dibutyl tin dilaurate | 0.3 |
| Portion 5 |  |
| Acetone | 100.0 |
| Portion 6 |  |
| Methyl methacrylate monomer | 270.0 |
| Butyl acrylate monomer | 59.8 |
| Dodecyl mercaptan | 16.0 |
| Portion 7 |  |
| Azobisisobutyronitrile | 12.0 |
| Methyl ethyl ketone | 80.0 |
| Ethylene glycol dimethyl ether | 80.0 |
| Total | 1586.2 |

Portion 1 is charged into a polymerization vessel equipped as in Example 1 and blanketed with nitrogen. During the following reaction the constituents are in the vessel and under constant agitation. Portion 1 is heated to its reflux temperature and held at this temperature until the resulting reaction mixture reaches an acid number of about 1 which takes about 4 hours. Water is removed from the reaction mixture as formed. Portion 2 is then added. Portion 3 is slowly added over a 15 minute period while holding the temperature at about 110° C. Portion 4 is added and the temperature of the reaction mixture is held at about 120° C. for about 40 minutes. Portion 5 is added and then portion 6 is added. About 25% of portion 7 is added and the temperature of the reaction mixture for the remainder of the reaction is held at about 85°-88° C. After about 15 minutes another 25% of portion 7 is added and after 30 minutes the remainder of portion 7 is added. The reaction is continued for about one additional hour.

The resulting solution has a polymer solids content of about 68.4% and a Gardner Holdt viscosity measured at 25° C. of about Z-½ and the resin has an acid number of about 1.1. The resin comprises about 66% of an alkyd resin of pelargonic acid/benzoic acid/pentaerythritol-/adipic acid and a backbone of about 1% isocyanato ethyl methacrylate, 27% methyl methacrylate and 6% butyl acrylate. The resin has a Mn of about 3,000-7,000.

A blue coating composition is prepared by first forming mill bases and then preparing the coating composition with these mill bases.

| White Mill Base | Parts by Weight |
|---|---|
| Titanium dioxide pigment | 690.90 |
| Acrylic Dispersion Resin Solution (70% solids of a styrene/methyl-methacrylate/butyl acrylate/ acrylic acid polymer having a weight ratio of constituents of 30/25/35/10 and the polymer has an acid number of 78 in ethylene glycol mono ethyl ether) | 69.13 |
| Ethylene glycol monoethyl ether | 25.77 |
| Ethylene glycol monobutyl | 214.20 |
| Total | 1000.00 |

The above constituents are mixed together and then charged into a conventional sand mill and ground for two passes to form the mill base.

| Blue Mill Base | Parts by Weight |
|---|---|
| "Monastral" Blue Pigment | 176.40 |
| Acrylic Dispersion Resin Solution (described above) | 237.78 |
| Ethylene glycol monoethyl ether | 88.62 |
| Ethylene glycol monobutyl ether | 497.20 |
| Total | 1000.00 |

The above constituents are mixed together and then charged into a conventional sandmill and ground for two passes to form the mill base.

A coating composition is prepared by blending the following constituents:

|  | Parts by Weight |
|---|---|
| Acrylic alkyd resin graft copolymer solution (prepared above) | 61.34 |
| Alkyd resin solution (prepared above) | 8.56 |
| Plasticizer resin solution (prepared above) | 3.57 |
| White Mill Base (prepared above) | 20.44 |

| | Parts by Weight |
|---|---|
| Blue Mill Base (prepared above) | 2.45 |
| Silicone anticratering solution (10% organic silicone polyether aqueous solution) | 0.49 |
| Methyl ethyl ketoxime | 0.24 |
| Cobalt naphthenate solution (55% solids in mineral spirits) | 0.97 |
| Triethyl amine | 1.94 |
| Total | 100.00 |

The above coating composition is reduced with water to a spray viscosity and sprayed onto a phosphatized steel substrate. A tack free finish is formed in about 4 hours that is resistant to printing, water spotting and gasoline resistant in 24 hours. The finish also has excellen weatherability.

A coating composition is formed by using the above constituents in the same amount except the above prepared acrylic polymer/alkyd resin blend was substututed for the acrylic alkyd resin graft copolymer solution. When water was added to reduce the resulting composition to a spray viscosity a fine dispersion was not formed but a distinct separate layer formed. This composition when sprayed onto a phosphatized steel substrate did not dry to a tack free finish but was soft and not resistant to tape printing water spotting and gasoline after 24 hours and had resistance to weathering.

EXAMPLE 5

A blue metallic coating composition is prepared by first forming mill bases and then preparing a coating composition with these mill bases.

| Green Mill Base | Parts by Weight |
|---|---|
| "Monastral" Green Pigment | 24.51 |
| Acrylic Dispersion Resin Solution (described in Example 4) | 22.31 |
| Ethylene glycol monoethyl ether | 53.18 |
| Total | 100.00 |

The above constituents are mixed together and then charged into a conventional sandmill and ground two passes to form a mill base.

| Aluminum Flake Mill Base | Parts by Weight |
|---|---|
| Aluminum Paste (66% aluminum flake in mineral spirits) | 16.44 |
| Acrylic alkyd resin graft copolymer solution (prepared in Example 4) | 71.30 |
| Ethylene glycol monoethyl ether | 10.41 |
| Triethyl amine | 1.85 |
| Total | 100.00 |

The above constituents are thoroughly blended together to form a mill base.

A coating composition is prepared by blending the following constituents:

| | Parts by Weight |
|---|---|
| Acrylic alkyd resin graft copolymer solution (described in Example 4) | 588.5 |
| Alkyd resin solution (79% solids of an alkyd resin of tung oil fatty acids, dehydrated castor oil fatty acids, benzoic acid, phthalic acid, isophthalic acid, pentaerythritol having an acid number of 4 and a number average molecular weight of about 1164 in a mixture of xylene and toluene) | 144.9 |
| Trimethylol propane trimethacrylate | 5.8 |
| U.V. Screener solution (35% solids of di[4(2,2,6,6 tetramethyl piperdinyl] sebacate in methyl ethyl keton) | 23.2 |
| Methyl ethyl ketoxime | 2.9 |
| Cobalt naphthenate solution (55% solids in mineral spirits) | 11.6 |
| Green Mill Base (prepared above) | 4.1 |
| Blue Mill Base (prepared in Example 4) | 47.6 |
| Triethyl amine | 18.7 |
| Aluminum Flake Mill Base (prepared above) | 94.8 |
| Silicone Anticratering solution (described in Example 4) | 5.8 |
| Total | 1000.0 |

The above coating composition is reduced with water to a spray viscosity and sprayed onto a phosphatized steel substrate. A tack free finish is formed in about 4 hours that is resistant to tape printing, water spotting and gasoline after 24 hours. The finish has excellent weatherability and is useful as an automotive or truck finish and can be used to refinish autos and trucks.

I claim:

1. A coating composition comprising a liquid diluent and about 10–70% by weight, based on the weight of the coating composition, of a binder in which the binder comprises a graft copolymer having an acrylic backbone which comprises about 25–90% by weight, of the graft copolymer and alkyd resin side chains which comprise about 10–75% by weight of the graft copolymer; wherein the backbone of the graft copolymer comprises polymerized ethylenically unsaturated acrylic monomers and about 0.1–20% by weight, based on the weight of the copolymer, of polymerized isocyanato alkyl acrylate or isocyanato alkyl methacrylate and the alkyd resin side chains being attached to the acrylic backbone by an isocyanato group wherein the isocyanato group being reacted with a hydroxyl or carboxyl group of the alkyd resin.

2. The coating composition of claim 1 in which the binder comprises about 80–99% by weight, based on the weight of the binder, of graft copolymer and 1–20% by weight of an alkyd resin.

3. The coating composition of claim 2 containing pigment in a pigment to binder weight ratio of about 1/100 to 200/100.

4. The coating composition of claim 3 in which the liquid diluent comprises water.

5. The coating composition of claim 3 containing about 1–25% by weight, based on the weight of the binder of an organic plasticizer.

6. The coating composition of claim 4 in which the acrylic backbone of the graft copolymer comprises polymerized monomers of methyl methacrylate, an alkyl methacrylate having 2-12 carbon atoms in the alkyl group, an ethylenically unsaturated carboxylic acid and isocyanato ethyl methacrylate.

7. The coating composition of claim 6 in which the alkyd resin of the graft copolymer comprises the reaction product of drying oil fatty acids, a polyol and organic carboxylic acids or an anhydride thereof.

8. The coating composition of claim 7 in which the acrylic backbone of the graft copolymer comprises polymerized monomers of methyl methacrylate, butyl methacrylate, methacrylic acid and isocyanato ethyl methacrylate and the side chains comprise an alkyd resin of dehydrated castor oil fatty acids, pentaerythritol, benzoic acid, phthalic anhdydride and an epoxy resin.

9. The coating composition of claim 7 in which the acrylic backbone of the graft copolymer comprises polymerized monomers of methyl methacrylate, butyl methacrylate, methacrylic acid and isocyanato ethyl methacrylate and the side chains comprise an alkyd resin of dehydrated castor oil fatty acids, soya bean oil fatty acids, benzoic acid, pentaerythritol, phthalic anhydride and isophthalic acid.

10. The coating composition of claim 7 in which the acrylic backbone of the graft copolymer comprises polymerized monomers of isocyanato ethyl methacrylate, methyl methacrylate, butyl methacrylate, t-butylaminoethyl methacrylate and methacrylic acid and the side chains comprise an alkyd resin of dehydrated castor oil fatty acids, soya bean oil fatty acids, benzoic acid, pentaerythritol, phthalic anhydride and isophthalic acid.

11. The coating composition of claim 7 in which the acrylic backbone of the graft copolymer comprises polymerized monomers of isocyanato ethyl methacrylate, methyl methacrylate, lauryl methacrylate, methacrylic acid and t-butyl amino ethyl methacrylate further reacted with isocyanato ethyl methacrylate and the side chains comprise an alkyd resin of dehydrated castor oil fatty acids, benzoic acid, pentaerythritol, phthalic anhydride and isopthalic acid.

12. The coating composition of claim 11 containing 1-20% by weight of an alkyd resin of tung oil fatty acids, dehydrated castor oil fatty acids, benzoic acid, pentaerythritol, phthalic anhydride and isophthalic acid.

13. The coating composition of claim 12, containing 1-20% by weight based on the weight of the binder, of a plasticizer resin of a graft copolymer having an acrylic backbone and alkyd resin side chains; in which the acrylic backbone comprises polymerized monomers of methyl methacrylate, t-butyl amino ethyl methacrylate, butyl acrylate or lauryl methacrylate and isocyanato ethyl methacrylate and alkyd resin side chains attached to the acrylic backbone by an isocyanato group reacted with a hydroxyl or carboxyl of the alkyd resin; wherein the alkyd resin comprises pelargonic acid, benzoic acid, pentaerythritol and adipic acid.

14. The coating composition of claim 12 containing 1-20% by weight, based on the weight of the binder, of a plasticizer of trimethylol propane trimethacrylate.

15. A substrate coated with about a 0.1-5 mil thick dried coalesced layer of the coating composition of claim 1.

16. A graft copolymer having an acrylic backbone which comprises about 25-90% by weight of the copolymer and alkyd resin side chain which comprises about 10-75% by weight of the copolymer; wherein
the backbone of the graft copolymer comprises polymerized ethylenically unsaturated acrylic monomers and from about 0.1-20% by weight, based on the weight of the copolymer, of polymerized isocyanato alky acrylate or isocyanato alkyl methacrylate and
the alkyd resin side chains being attached to the acrylic backbone by an isocyanato group wherein the isocyanato group being reacted with a hydroxyl or carboxyl group of the alkyd resin.

17. The graft copolymer of claim 16 in which the acrylic backbone of the graft copolymer comprises polymerized monomers of a methyl methacrylate, an alkyl methacrylate having 2-12 carbon atoms in the alkyl group, an ethylenically unsaturated carboxylic acid and isocyanato ethyl methacrylate.

18. The graft copolymer of claim 17 in which the alkyd resin side chains comprise the reaction product of drying oil fatty acids, a polyol and a carboxylic acids or an anhydride thereof.

19. The graft copolymer of claim 18 in which the acrylic backbone of the graft copolymer comprises polymerized monomers of methyl methacrylate, butyl methacrylate, methacrylic acid and isocyanato ethyl methacrylate and the side chains comprise an alkyd resin of dehydrated castor oil fatty acids, pentaerythritol, benzoic acid, phthalic anhydride and an epoxy resin.

20. The graft copolymer of claim 18 in which the acrylic backbone of the graft copolymer comprises polymerized monomers of methyl methacrylate, butyl methacrylate, methacrylic acid and isocyanato ethyl methacrylate and the side chains comprise an alkyd resin of dehydrated castor oil fatty acids, soya bean oil fatty acids, benzoic acid, pentaerythritol, phthalic anhydride and isophthalic acid.

21. The graft copolymer of claim 18 in which the acrylic backbone of the graft copolymer comprises polymerized monomers of isocyanato ethyl methacrylate, methyl methacrylate, butyl methacrylate, t-butylaminoethyl methacrylate, methacrylic acid and the side chains comprise an alkyd resin of dehydrated castor oil fatty acids, soya bean oil fatty acids, benzoic acid, pentaerythritol, phthalic anhydride and isophthalic acid.

22. The graft copolymer of claim 18 in which the acrylic backbone of the graft copolymer comprises polymerized monomers of isocyanato ethyl methacrylate, methyl methacrylate, lauryl methacrylate, methacrylic acid and t-butyl amino ethyl methacrylate, further reacted with isocyanato ethyl methacrylate and the side chains comprise an alkyd resin of dehydrated castor oil fatty acids, benzoic acid, pentaerythritol, phthalic anhydride and isophthalic acid.

23. The graft copolymer of claim 18 in which the acrylic backbone of the graft copolymer comprises polymerized monomers of methyl methacrylate, butyl acrylate and isocyanato ethyl methacrylate and the side chains comprise an alkyd resin of pelargonic acid, benzoic acid, pentaerythritol and adipic acid.

24. A process for forming a graft copolymer having an acrylic backbone and alkyd resin side chains which comprises:
Step (1)

forming an alkyd resin by contacting drying oil fatty acids, a polyol and a dicarboxylic acid or an anhydride thereof in the presence of a esterification catalyst at about 50°-250° C. for about 0.5-4 hours;

Step (2)

adding sufficient isocyanato alkyl acrylate or isocyanato alkyl methacrylate to the alkyd resin of step (1) to form chains of alkyd resin having a terminal ethylenically unsaturated group; and Step (3)

adding ethylenicaly unsaturated acrylic monomers to the product of step (2) and heating to about 75°-170° C. for about 0.5-4 hours in the presence of an azo type polymerization initiator to form the graft copolymer.

25. A substrate having a finish of a clear coat top layer in firm adherence to a color coat layer in adherence with the substrate; wherein the clear coat consists essentially of a transparent film forming binder of claim 1 the color coat consists essentially of a film forming binder of claim 1 and pigments in a pigment to binder weight ratio of about 1/100 to 150/100; and the color coat contains about 0.1-20% by weight, based on the weight of the binder, of an ultraviolet light stabilizer.

26. The substrate of claim 25 in which the color coat is about 0.4-1.5 mils thick and the clear coat is about 0.5-5.0 mils thick.

27. The substrate of claim 26 in which both the color coat and the clear coat each contain an ultraviolet light stabilizer.

28. The substrate of claim 26 in which both the color coat and the clear coat each contain about 1-20% by weight, based on the weight of the binder, of an ultraviolet light stabilizer and about 0.1-5% by weight, based on the weight of the binder, of an antioxidant; wherein the weight ratio of ultraviolet light stabilizer to antioxidant is 1:1 to about 50:1.

* * * * *